United States Patent [19]

Kolosov et al.

[11] 4,116,803

[45] Sep. 26, 1978

[54] METHOD AND APPARATUS FOR FORMING CERMET ELECTRODES FOR ALKALINE ACCUMULATORS

[76] Inventors: Ivan Alexandrovich Kolosov, ulitsa Astrakhanskaya, 118, kv. 54; Jury Egorovich Ivanyatov, ulitsa M. Zatonskaya, 21; Vera Nikolaevna Kalininskaya, ulitsa Sakko-Vantsetti, 23, kv. 23, all of Saratov, U.S.S.R.

[21] Appl. No.: 795,880

[22] Filed: May 11, 1977

[51] Int. Cl.² .................. C25D 17/06; C25D 17/08; C25D 17/10
[52] U.S. Cl. ...................... 204/272; 204/2.1; 204/297 W; 204/297 R
[58] Field of Search ............. 204/2.1, 297 W, 297 R, 204/272, 140, 130; 429/94

[56] References Cited

U.S. PATENT DOCUMENTS

| | | | |
|---|---|---|---|
| 2,129,868 | 9/1938 | Pearson | 204/297 W |
| 2,349,946 | 5/1944 | Durr | 204/297 W |
| 3,061,527 | 10/1962 | Karner et al. | 204/15 |
| 3,375,186 | 3/1968 | Smith | 204/297 W |

FOREIGN PATENT DOCUMENTS 463,480  3/1950  Canada ................ 204/297 W

*Primary Examiner*—T. M. Tufariello
*Attorney, Agent, or Firm*—Lackenbach, Lilling & Siegel

[57] ABSTRACT

A method for forming cermet electrodes for alkaline accumulators, consisting in winding a band stock together with a counterelectrode into a roll, connecting the ends of the band stock and the counterelectrode to the opposite poles of a power source, and forming cermet electrodes by anode and cathode polarization of said band stock in an electrolyte, said band stock being assembled together with the counterelectrode and insulated therefrom.

An apparatus for carrying out the method of forming cermet electrodes for alkaline accumulators, according to the invention, comprises an electrolyte bath having disposed therein a spool whereupon are simultaneously wound a band stock and a counterelectrode insulated from each other; the width of said spool being 10 to 15% larger than those of the band stock and the counterelectrode, the band stock and the counterelectrode are axially offset relative to each other during winding, the heads of said spool being insulated from each other and formed with openings for accommodating therein contact terminals.

2 Claims, 5 Drawing Figures

METHOD AND APPARATUS FOR FORMING CERMET ELECTRODES FOR ALKALINE ACCUMULATORS

The present invention relates to the manufacture of accumulators, and more particularly to a method and an apparatus for forming cermet electrodes used in alkaline accumulators.

The proposed method and apparatus for forming cermet electrodes for alkaline accumulators can be used in the manufacture of most types of nickel-cadmium accumulators, thus ensuring higher labour productivity, smaller floor space, and lower labour consumption, especially in forming thin bands stock for electrodes of accumulators having a higher specific energy-storage capacity.

The increase of specific energy-storage capacity of alkaline accumulators employing cermet electrodes, for example, for batteries used in aircraft industry, in electromobiles, etc., is attained mainly due to making especially thin electrodes which are punched out from the band stock after its forming and cleaning from impurities.

The known method of forming especially thin band stock having a thickness of a perforated metal substrate of 20 to 50 microns (see, for example, M. A. Dasoyan, *Proizvodstvo electricheskikh akkumulatorov*, /Production of Electric Accumulators/, Vysshaya Shkola Publishers, Moscow, 1970, pp. 387–388) involves technological difficulties caused by the insufficient thickness of such bands. Therefore, the forming is done either with individual electrodes or short lengths of band stock equal in length to that of 1 to 3 electrodes which are punched out from a sintered band stock prior to forming.

The above-mentioned method resides in that the band stock is assembled manually into process units in conjunction with counterelectrodes and separators, the pre-welded output terminals of electrodes are connected to the opposite poles of a power source and each unit is placed in an electrolyte bath, said band stock is thereafter subjected to anode and cathode polarization. After dismantling said output terminals, washing and then cleaning the band stock manually with mechanical brushes, ready electrodes are punched out from the band stock.

Said method requires substantial consumption of manual labour, it is inefficient and does not lend itself to mechanization.

There is known in the art a method of forming band stock (see, for example, USSR Inventor's Certificate No. 145,264, Cl. HO1 $m$ 35/30, 1961) by means of passing a band stock successively through two baths between the counterelectrodes connected to the opposite poles of a power source.

It is also known that the French company Saft, the leading manufacturer of accumulators having sintered electrodes, carries out the forming (electrochemical cleaning) of band stock by passing a band stock through electrolyte baths between the counterelectrodes being insulated from the band and connected to a power source.

The apparatuses for carrying the above-mentioned method into effect comprise electrolyte baths having disposed therein counterelectrodes, a system of rollers connected to a drive for drawing the band stock between the counterelectrodes, and contact means for connecting the sections of the band stock and counterelectrodes to the opposite poles of a power source.

The above-described method for forming cermet band stock suffers from a number of disadvantages, i.e. it is impossible to form especially thin band stock since the band stock of low strength cannot be passed between the plurality of rollers due to presence of repeated sign-variable bends of the band stock over the rollers, and the apparatuses for carrying the method into effect are bulky, require large floor space and involve considerable maintenance expenditures.

It is an object of the present invention to provide a method and an apparatus for forming metal-ceramic electrodes of an alkaline accumulator, which enable the forming of especially thin electrodes.

It is another object of the invention to provide such an apparatus which does not require much floor space and involves minimum manual labour for its maintenance.

These and other objects and advantages are accomplished by the provision of a method for forming cermet electrodes for alkaline accumulators by anode and cathode polarization of a band stock in an electrolyte, said band stock being assembled together with a counterelectrode and insulated therefrom, according to the invention, the band stock is wound together with the counterelectrode into a roll prior to forming, the ends of the band stock and the counterelectrode being thereafter connected to the opposite poles of a power source.

It is advisable that in the course of reeling the band stock and the counterelectrode be axially offset relative to each other thereby to enable the formation of spirals having the same polarity and extending beyond the both ends of the roll.

Said object is also attained in an apparatus for carrying the proposed method into effect, comprising an electrolyte bath having disposed therein counterelectrodes with a band stock arranged therebetween and insulated therefrom according to the invention, there is provided a spool whereupon are simultaneously wound the band stock and the counterelectrode heads of said spool being insulated from each other and formed with radial openings accommodating therein contact terminals, the width of the spool being 10 to 15% larger than that of the band stock, thereby providing axial offsetting of the band stock and the counterelectrode relative to each other during winding, said electrode being formed of a band.

It is advisable to make the contact terminal in the form of a comb consisting of tapered plates mounted on a rod and separated from one another by spring washers, the comb being compressed by a cam acting on levers located at the ends of the comb and connected by a ring busbar to the opposite terminals of a power source.

The method and the apparatus for forming cermet electrodes for alkaline accumulators in accordance with the present invention ensure enhanced labour productivity and lower consumption of labour in the process of forming especially thin band stock for electrode of accumulators having a higher specific energy-storage capacity owing to the fact that the preliminary winding of such bands onto spools prior to forming which is conducted, in a mechanized manner, makes it possible to form and subsequently clean electrodes which are punched out from this band stock.

In addition, unlike the above-described analogs, the apparatus, according to the invention, is compact, the floor space required therefor being 4 to 5 times smaller than that of apparatus intended for passing bands between rollers and counterelectrodes in baths, which renders it economically profitable where forming of sufficiently thick and durable band stock is required.

The application of the method of winding rolls of bands onto a spool, according to the invention, with axial offsetting of the band stock and the counterelectrode relative to each other and the use of contact terminals made in the form of a comb connected respectively to the band ends and busbars of a power source by quick-acting clamps, for example, being in the form of a cam, ensure reliable supply of operating current to the bands (up to 5 amperes per square decimeter of the surface of the band stock) and at the same time makes it possible to assemble the spool in conjunction with busbars with minimum labour expenditures.

The invention is further described in detail with reference to the accompanying drawings illustrating a specific embodiment thereof, wherein.

A method for forming cermet electrodes used in alkaline accumulators, according to the invention, resides in that a band stock for electrodes is wound together with a counterelectrode into a roll. Then the forming of the band stock is effected directly in the roll as it is introduced into electrolyte, the ends of the band stock and the counterelectrode being electrically connected to the opposite poles of a power source. At intervals the polarity at the ends of the band stock and the counterelectrode is reversed to thereby result in the anode and cathode polarization of the band stock in the electrolyte. Then, the roll is wound the band stock undergoes mechanical cleaning and washing, and ready electrodes for alkaline accumulators are thereafter punched out therefrom.

For conveniently connecting the band stock and counterelectrodes to the opposite poles of a power source when winding them into a roll, the former and the latter are axially offset relative to each other, thus ensuring the formation of spirals having the same polarity at the ends of the roll.

Due to such axial offsetting of the band stock and the counterelectrode during their winding into a roll with the formation of like polarity at the ends of the roll it becomes possible to carry out anode and cathode polarization (forming of the electrode) directly in the roll irrespective of both thickness and strength of the band stock.

The herein proposed method of the forming cermet electrodes for alkaline accumulators using the band stock makes it possible to mechanize auxiliary operations and can be effected by the apparatus proposed below.

Figure 1:
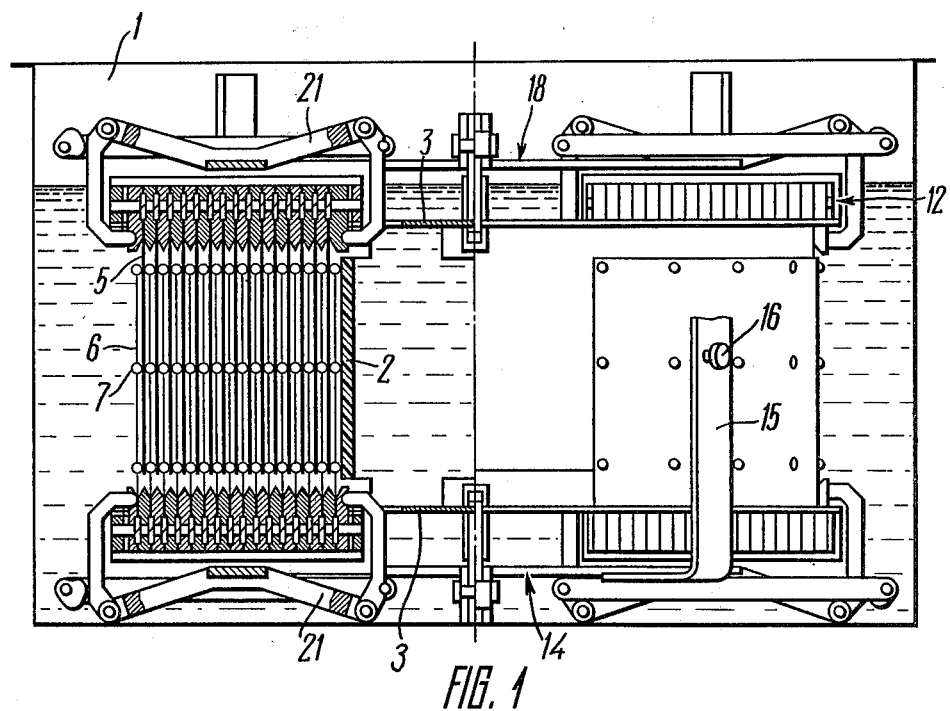
FIG. 1 is a general sectional view of an apparatus for carrying into effect a method of forming cermet electrodes for alkaline accumulators.
Figure 2:
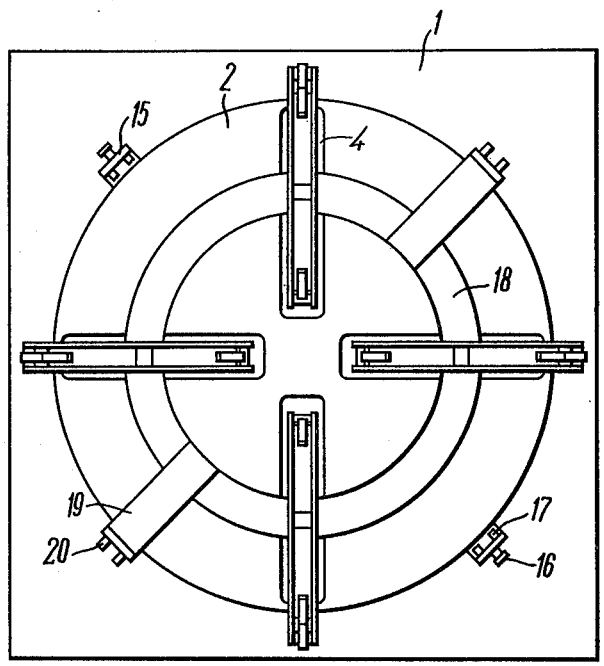
FIG. 2 is a plan view of same.
Figure 3:
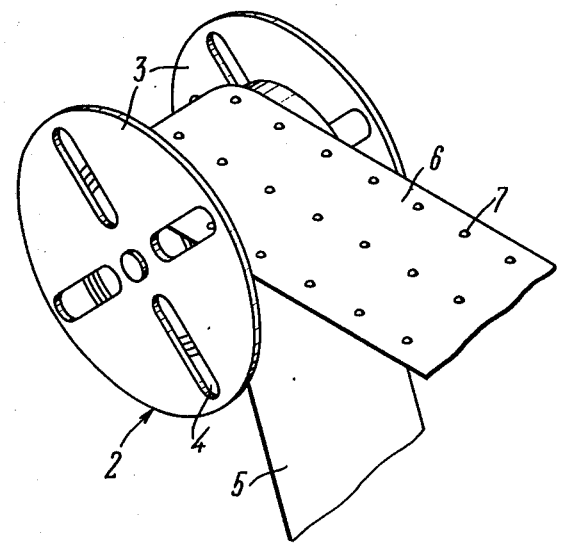
FIG. 3 shows a spool in the process of winding bands thereonto.

The apparatus of the invention for forming cermet electrodes for alkaline accumulators, according to the present invention, comprises a bath 1 (FIGS. 1 and 2) filled with an electrolyte wherein there is disposed a spool 2 (FIGS. 1, 2 and 3) whose heads 3 being electrically insulated from each other and formed with radial openings 4 (FIGS. 2 and 3).

A band stock 5 and a counterelectrode 6 are wound together onto the spool 2 so that they are axially offset relative to each other. The counterelectrode 6 is also made as a band is provided with insulating projections 7. The width of the spool 2 is 10 to 15% larger than those of the initial band 5 and the counterelectrode 6, thus ensuring the formation of spirals having the same polarity at the ends of the spool 2.

Figure 4:
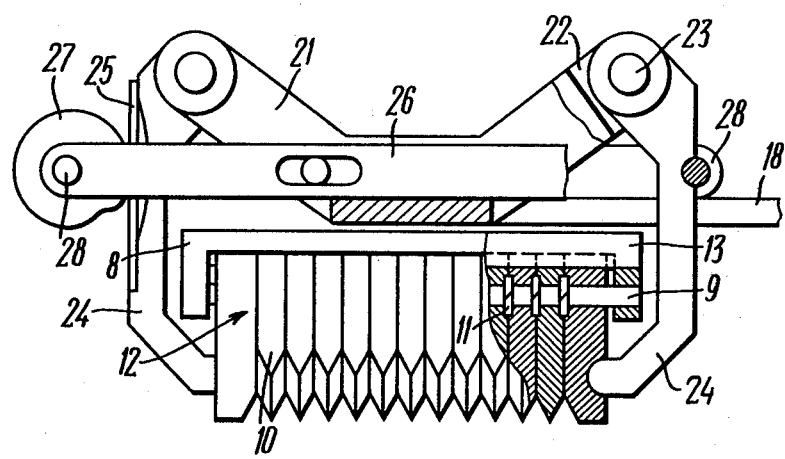
FIG. 4 shows a ring busbar with a contact comb secured thereon.
Figure 5:
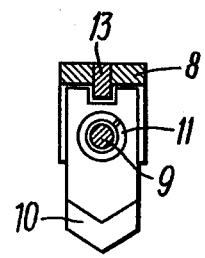
FIG. 5 is a sectional view of a contact comb.

Each opening 4 (FIGS. 2 and 3) in the heads 3 of the spool 2 adjacent the ends of the spirals houses contact terminals each of which comprises a II-shaped body 8 (FIG. 4) made with a lug having a rod 9 (FIGS. 4 and 5) mounted therein Tapered plates 10 separated by spring washers 11 and forming a comb 12 are freely mounted on the rod 9. A fixing gib 13 accomodated in slots made in the end of each plate 10 is provided in the II-shaped body 8 so as to prevent the plates 10 from turning on the rod 9.

Adjacent to the lower head 3 of the spool 2 (FIGS. 1 and 2) is a ring busbar 14 provided with two current-supplying bars 15 (FIG. 2) extending above the surface of the electrolyte. Provided in the middle portion of the bars 15 are pins 16 and in the ends of the bars 15 there are provided circuit terminals 17 for securing a feeder cable being connected to the pole of a power source (not shown).

Adjacent to the upper head 3 of the spool 2 is a ring busbar 18 provided with two current-supplying bars 19 extending above the surface of the electrolyte and having circuit terminals 20 in their ends for securing a feeder cable being connecting to the opposite pole of the power source.

Supports 21 (FIG. 4) having lugs 22 in which levers 24 are mounted on pivots 23 are secured in the ring busbars 14 and 18 (FIGS. 2 and 4) according to the arrangement of the openings 4 in the heads 3 of the spool 2. The levers 24 embrace the ends of the contact terminal respectively.

A flat spring 25 is secured on the external surface of the lever 24 and a frame 26 having a cam 27 disposed on the axis 28 thereof is mounted in each support 21. The cam 27 engages the spring 25 and the levers 24 to compress the plates 10 of the contact terminal together with the turns of the band stock 5 and the counterelectrode 6, said turns being disposed between the plates during operation.

The apparatus in accordance with the invention operates in the following manner.

Prior to forming, the band stock 5 (FIG. 3) and the counterelectrode 6 are wound together onto the spool 2, the band stock 5 being wound closely to one head 3 and the counterelectrode 6 to the other head of the spool 2 so that with the width of the spool 2 being 10 to 15% larger than those of the band stock 5 and of the counterelectrode 6, the spirals of only one of the bands are formed adjacent to each head 3 of the spool 2. After winding, the ends of the bands are fixed, for example, fastening them with an insulation cord (not shown). The spool 2 with the wound bands, the spirals of the counterelectrode 6 being faced upward, is placed onto a work table located near the bath 1. The contact terminals are arranged in the openings 4 in the heads of the spool 2 so that the tapered plates 10 (FIGS. 4 and 5) of the comb 12 are arranged between the turns of the band of the counterelectrode 6 (FIG. 3).

After arranging the contact terminals in all the openings 4, the ring busbar 14 (FIG. 1) is set on the upper head 3 of the spool 2, with the levers 24 (FIG. 4) being abutted the ends of the combs 12. After matching all the combs 12 and the levers 24, the plates 10 of the contact terminals are compressed by turning the cams 27 acting on the spring 25.

The spool 2 together with the ring busbar 14 is then lifted by the pins 16 of the bars 15 (FIGS. 1 and 2), overturned, for example, by means of a hoist grapple (not shown), and placed onto a work table, with the spirals of the band stock 5 being faced upward. The contact terminals and the ring busbar 18 are placed on these spirals in the same manner and the plates 10 of the contact terminals are thereafter compressed.

The spool 2 assembled with the busbars 14 and 18 is then lowered into the bath 1, for example, by the same pins 16, the feeder cables are secured in the terminals 17 and 20 of the respective current-supplying bars 15 and 19, and the bath is thereafter filled with the electrolyte. After impregnating the band with the electrolyte the power source is energized whereafter the positive (anode) polarization of the band stock is carried out according to the process requirements.

In a pre-determined period the polarity of the current-supplying bars 15 and 19 is reversed by using an electric switch and the negative (cathode) polarization of the initial band 5 is carried out.

On completion of this operation, according to the process requirements, the electrolyte is drained off, the bath is filled with water and the preliminary washing of the apparatus parts is carried out so as to remove the electrolyte therefrom whereby is ensured safe operation during unwinding of the spool.

After being released from the busbars 14 and 18 the spool is directed to the machine for unwinding; the band stock 5 is then subjected to washing and cleaning, with ready electrodes being punched out therefrom.

The apparatus for forming cermet electrodes according to the present invention, makes it possible to carry out the method of forming thin and low-strength electrodes for accumulators by using a band stock, which is due to the fact that the apparatus is provided with a spool 2 whose width is 10 to 15% larger than those of the band stock 5 and the counterelectrode 6, which results in that the bands are axially offset relative to each other during winding and the contact terminals, made in the form of a comb 12 consisting of tapered plates 10, connect the ends of the band stock 5 and of the counterelectrode 6 to the busbars 14 and 18 which are in turn connected to the opposite poles of a power source by means of quick-acting clamps.

A small size of the spool 2 and 5 a considerable length of the band stock being wound onto it, as well as the possibility of supplying electric current of over 1000 amps through the contact terminals to the ends of the bands make it possible to achieve high efficiency with the apparatus being compact as a whole.

What is claimed is:

1. An apparatus for forming cermet electrodes used in alkaline accumulators comprising: an electrolytic tank; a spool disposed in said tank and having wound thereon a counterelectrode and a band stock insulated from each other; the width of said spool being 10 to 15% larger than that of the band stock and the counterelectrode, whereby the band stock and the counterelectrode are axially offset relative to each other during winding, said counterelectrode being formed of a band; the heads of said spool being insulated from each other and formed with openings; and contact terminals being arranged in said openings.

2. An apparatus as claimed in claim 1, wherein said contact terminals are made in the form of a comb consisting of tapered plates mounted on a rod and separated by spring washers, the comb being compressed by a cam acting on levers located at the ends of said comb and connected via ring busbars to the opposite terminals of a power source.

* * * * *